United States Patent [19]

Matson

[11] Patent Number: 4,662,862

[45] Date of Patent: May 5, 1987

[54] TENSIONING DEVICE FOR FLEXIBLE DRIVE ELEMENT

[76] Inventor: Les Matson, Rte. 2, Box 2311, Selah, Wash. 98942

[21] Appl. No.: 821,295

[22] Filed: Jan. 22, 1986

[51] Int. Cl.[4] ............................................. F16H 7/08
[52] U.S. Cl. ..................................... 474/101; 474/111
[58] Field of Search ............... 474/101, 111, 139, 109, 474/134, 135, 137, 138

[56] References Cited

U.S. PATENT DOCUMENTS

| | | | |
|---|---|---|---|
| 976,115 | 11/1910 | Bard | 474/134 |
| 2,210,276 | 8/1940 | Bremer | 474/111 X |
| 2,639,623 | 5/1953 | Ausherman | 474/134 |
| 2,963,918 | 12/1960 | Blakstad | 474/111 |
| 3,575,058 | 4/1971 | Kraus | 474/109 X |
| 3,630,096 | 12/1971 | Brewer | 474/132 |
| 3,673,884 | 7/1972 | Southiere | 474/111 X |
| 3,811,332 | 5/1974 | Brown et al. | 474/111 |
| 3,931,745 | 1/1976 | Dobberpuhl | 474/111 |
| 3,933,055 | 1/1976 | Newhouse et al. | 474/111 |
| 3,964,331 | 6/1976 | Oldfield | 474/111 X |

Primary Examiner—Stephen J. Novosad
Assistant Examiner—Thuy M. Bui
Attorney, Agent, or Firm—Christensen, O'Connor, Johnson & Kindness

[57] ABSTRACT

A tensioning device (10) for a flexible drive element (16), the tensioning device comprising a first tensioning member (40) shaped to form a channel (52) having a first contact surface (58), and a second tensioning member (140) shaped to form a channel (152) having a second contact surface (158). Straps (34, 36) and engagement means (42, 44, 142, 144) secure the first and second tensioning members a selected distance away from one another by means of a ratchet-like mechanism arranged such that the force required to move the tensioning members toward one another is smaller than the force required to move the tensioning members away from one another. The tensioning device may be operated without any means securing the tensioning device with respect to the sprockets. Grooves (60, 160) are provided in the respective channels to maintain the sides of the flexible drive element out of contact with the channel sides.

8 Claims, 4 Drawing Figures

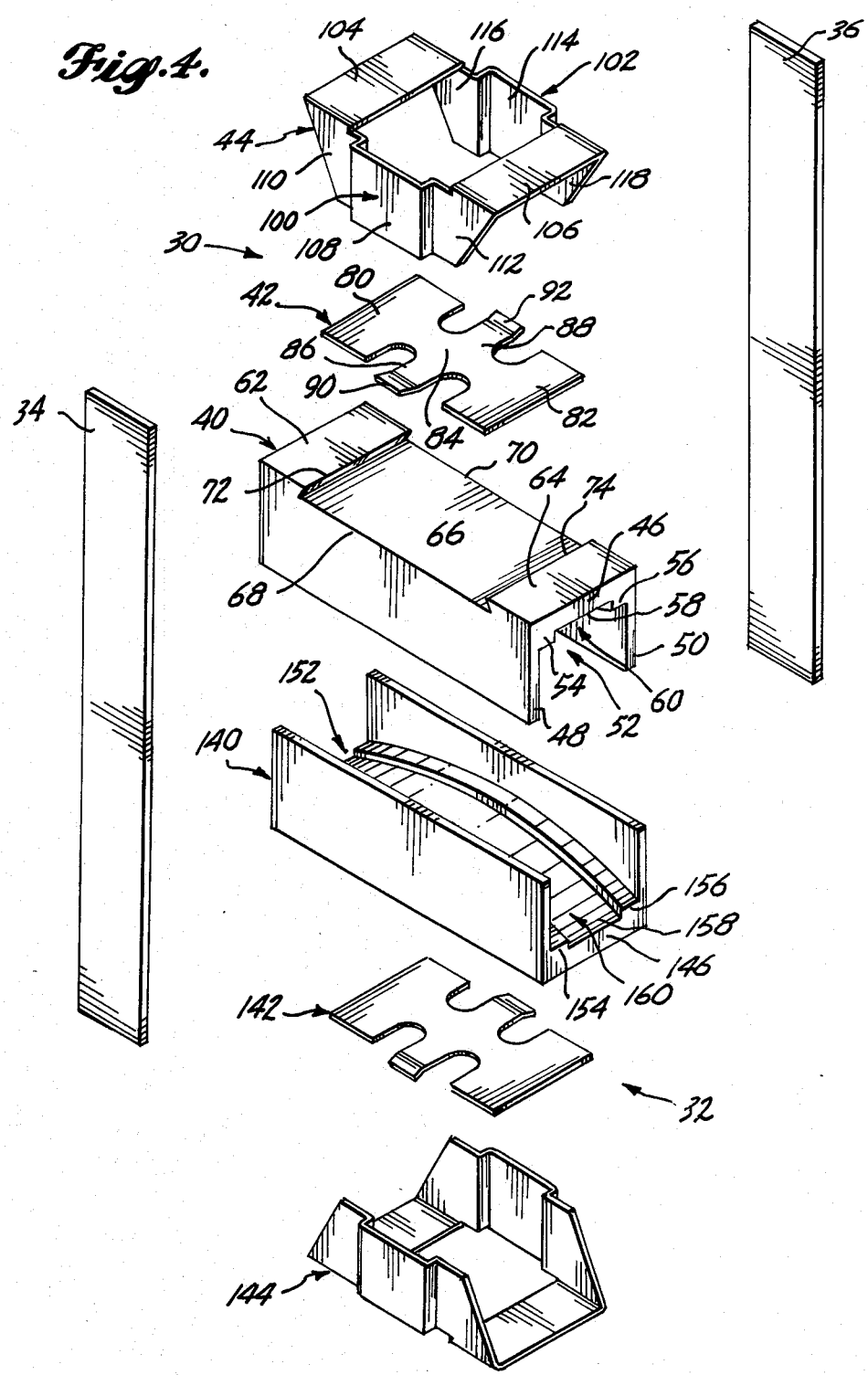

TENSIONING DEVICE FOR FLEXIBLE DRIVE ELEMENT

FIELD OF THE INVENTION

The present invention relates to tensioning devices for drive systems that include flexible drive elements such as drive chains and drive belts.

BACKGROUND OF THE INVENTION

The present invention is adapted for use with a conventional drive system in which a driven sprocket and a drive sprocket are connected by a flexible drive element such as a drive chain. In such an arrangement, it is well known that the proper functioning of the drive system and the operating life of the drive chain can be significantly enhanced by maintaining the two drive chain runs between the sprockets in tension such that significant slack does not occur in either run. One means of providing such tension is to resiliently bias the sprockets away from one another. However, a more common and typically more convenient arrangement is to provide a tensioning device that biases one or both drive chain runs inward towards the other run at a point intermediate the sprockets. A number of examples of this latter type of tensioning device are disclosed in the prior art. However, in the great majority of prior tensioning devices, the tensioning device is adapted to operate in a particular drive system, e.g., to operate with a given arrangement of sprockets and drive chain.

One result of the fact that prior tensoning devices have been adapted for specific applications is that in essentially all cases, prior tensioning devices have been mounted or secured to a support that is fixed with respect to the sprocket axles. Through use of such a support arrangement, the position of the tensioning device between the sprockets can be controlled, to maintain the tensioning device at the optimum position. The use of fixed supports has been viewed as especially important for tensioning devices adapted to operate with sprockets that are or may be horizontally positioned with respect to one another. In such a horizontal arrangement, the weight of the tensioning device does not affect its position, i.e., the position of the tensioning device between the sprockets is not in any way controlled by gravity acting on the tensioning device.

A further feature of essentially all prior art tensioning devices is that in such devices, the surfaces contacting the two runs of drive chain and urging them inward have either been fixed in position with respect to one another, or resiliently biased towards one another by springs or similar means. A disadvantage of the resilient biasing technique is that it adds complexity to the tensioning device, and the resilient means are themselves subject to wear over time. Tensioning devices having fixed distances between their contact surfaces cannot be adjusted as the chain experiences increased wear. Thus, the tensioning force provided by the device decreases over time, at least in those arrangements where the sprockets are horizontally positioned with respect to one another. A further disadvantage of a fixed distance between contact surfaces is that the tensioning device cannot be used with different sized sprockets.

SUMMARY OF THE INVENTION

The present invention provides a tensioning device that overcomes a number of the limitations of prior tensioning devices. The tensioning device of the present invention is adapted for use with a drive system having a flexible drive element extending between sprockets, pulleys or the like. The tensioning device comprises first and second tensioning members, and positioning means for securing the first and second tensioning members a selected distance away from one another. The first tensioning member is shaped to form a channel in one surface thereof, the channel including an elongated portion having a first contact surface. Similarly, the second tensioning member is shaped to form a channel in one surface thereof, the channel including an elongated portion having a second contact surface. The positioning means positions the first and second tensioning members such that the first and second contact surfaces are spaced apart from and facing one another. The positioning means inlcudes means for adjusting the spacing between the contact surfaces, to thereby adjust the tensioning apparatus, so as to cause the tensioning apparatus to apply a suitable force to the drive element. In a preferred aspect, the positioning means includes a ratchet-like mechanism arranged such that the force required to move the tensioning members toward one another is smaller than the force required to move the tensioning members away from one another.

The positioning means may include a pair of straps extending between the first and second tensioning members, and engagement means for connecting the straps to the tensioning members. The engagement means comprises a pair of engagement members such as blades, and fastening means for securing the blades to the tensioning member. The fastening means preferably comprises a clip shaped to form a pair of slots through which the respective straps extend. The blades extend into the respective slots, so as to engage the straps. Each blade includes a tip that is angled away from the associated tensioning member, to thereby provide the ratchet-like mechanism. Openings are provided adjacent the blades, such that a tool may be inserted between each blade and the corresponding tensioning member, to move the blade out of contact with the strap. In another preferred aspect, each channel includes an elongated central portion comprising the contact surface, flanked by a pair of rails that extend outward from the contact surface to either side thereof. The contact surface and rails define a groove through which the flexible drive element rides, the height of the rails above the contact surface being less than the thickness of the flexible drive element. The flexible drive element is thereby kept out of contact with the sides of the channel, to minimize friction between the drive element and the tensioning members.

BRIEF DESCRIPTION OF THE DRAWINGS

FIG. 4 is an exploded perspective view of the tensioning device of FIG. 1.

DETAILED DESCRIPTION OF THE DRAWINGS

Figure 1:
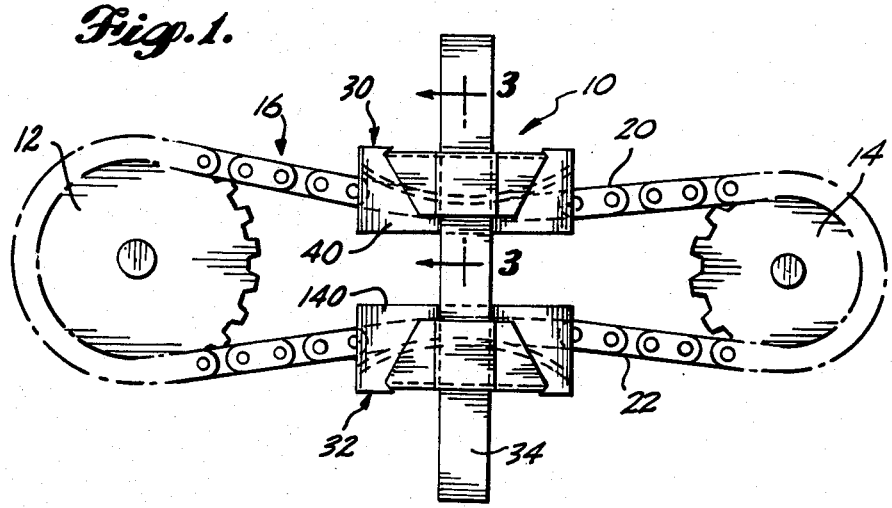
FIG. 1 is a side elevational view of the tensioning device of the present invention used in connection with a drive chain.
Figure 2:
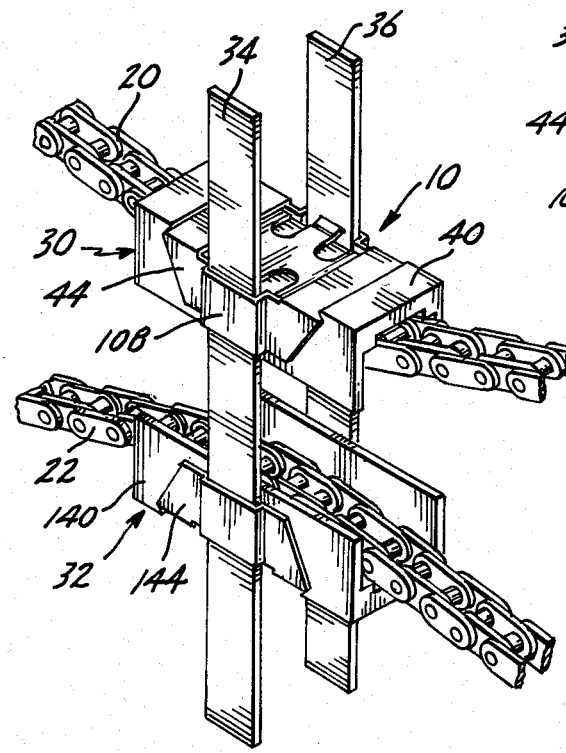
FIG. 2 is a perspective view of the tensioning device of FIG. 1.

FIGS. 1 and 2 illustrate tensioning device 10 of the present invention used in connection with a conventional drive system that includes sprockets 12 and 14 interconnected by drive chain 16. An upper run 20 of the drive chain extends between the upper sides of sprockets 12 and 14, and lower run 22 extends between the lower sides of the sprockets. Depending upon which of sprockets 12 and 14 is driven and upon the direction of such drive, either upper run 20 or lower run 22 will be placed under tension by the driving mechanism. However, in the absence of the tensioning device of the present invention, the other run will be slack, thereby increasing chain wear and ultimately leading to the possibility that the chain will come off one of the sprockets.

Tensioning device 10 comprises upper assembly 30 and lower assembly 32 interconnected by straps 34 and 36. Upper assembly 30 includes block 40 that engages upper run 20, and lower assembly 32 includes block 140 that engages lower run 22. The blocks are connected to the straps by ratchet-like arrangements, described below, such that the blocks can be moved toward one another upon application of a comparatively small force, but can be moved away from one another only upon application of a comparatively large force, or by use of a separate tool. Thus during operation of the tensioning device, straps 34 and 36 hold the upper and lower assemblies in fixed position with respect to one another, despite the tension exerted by drive chain 16 tending to move blocks 40 and 140 away from one another. However, the tensioning device of the present invention can readily be adjusted to decrease the separation between the blocks during the life of the drive chain, to take up slack caused by increasing drive chain wear. Furthermore, when the tensioning device of the present invention is installed on a drive chain or other flexible drive means, the distance between the blocks can be varied over a wide range, and the tensioning device can therefore be used for a wide range of sprocket sizes and distances between the upper and lower runs.

A further important feature of the present invention is that it is capable of operation without any means for positioning the tensioning device on runs 20 and 22 between the sprockets. This is true for all positions of the sprockets with respect to one another, including the horizontal position shown in FIG. 1. It is also true regardless of which of sprockets 12 and 14 is the drive sprocket and regardless of the direction of rotation of the sprockets. The tensioning device of the present invention therefore provides a device having a wide range of applications to different drive systems. It is to be understood that the present invention is also applicable to drive systems in which a drive belt or cable interconnects two pulleys or the like, and its use and construction for such a drive system is identical to that described herein for the sprocket and drive chain arrangement.

Referring now principally to FIG. 4, upper assembly 30 comprises block 40, blade member 42, and clip 44. Similarly, lower assembly 32 comprises block 140, blade member 142 and clip 144. In the preferred embodiment illustrated in the Figures, the elements of the upper and lower assemblies are identical to one another, and a numbering scheme is used in which elements of the lower assembly are assigned reference numerals 100 greater than the reference numerals of the corresponding elements of the upper assembly. Where the context permits, reference in the following description to an element of one of assemblies 30 and 32 shall be understood as also referring to the corresponding element in the other assembly.

Figure 3:
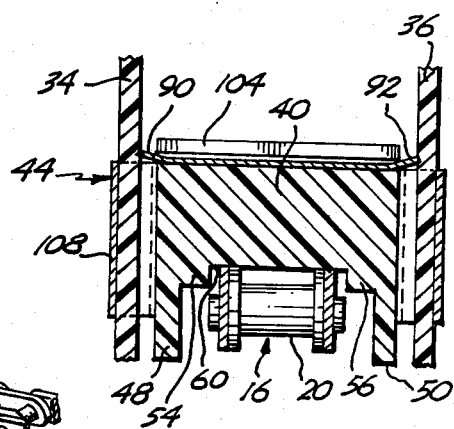
FIG. 3 is a cross-sectional view taken along line 3—3 of FIG. 1.

Block 40 includes center portion 46 from which identical sidewalls 48 and 50 extend to form U-shaped channel 52. The side of center portion 46 that faces inwardly into channel 52 comprises contact surface 58 flanked by rails 54 and 56. The rails and contact surface have a common arcuate shape, and the height of the rails above the contact surface is constant, to thereby form convex groove 60 that extends the full length of channel 52. Upper run 20 of drive chain 16 rides in groove 60, as best indicated in FIG. 3. Rails 54 and 56 keep the sides of chain 16 away from sidewalls 48 and 50, thereby minimizing friction between the drive chain and the block.

The surface of center portion 46 that faces away from channel 52 includes projections 62 and 64 at opposite longitudinal ends of the center portion, and mounting surface 66 between the projections. Mounting surface 66 includes lateral edges 68 and 70. The inner edges of projection 62 and 64 includes lips 72 and 74 that are slightly overhanging with respect to the adjacent portions of mounting surface 66.

Blade member 42 includes end sections 80 and 82 and center section 84. Center section 84 includes laterally extending blades 86 and 88. The outer edges of blades 86 and 88 include tips 90 and 92 that are angled slightly out of the plane of the blade member in a direction away from mounting surface 66 and block 40. The function of blades 86 and 88 is described below.

Clip 44 includes side pieces 100 and 102 interconnected by top pieces 104 and 106. Side piece 100 comprises center portion 108 that is shaped to form a shallow, inwardly facing, U-shaped groove. Center portion 108 is flanked by end portions 110 and 112. Similarly, side piece 102 comprises center portion 114 flanked by end portions 116 and 118, center portion 114 also being shaped to form a shallow, inwardly facing, U-shaped groove. Top piece 104 interconnects end portions 110 and 116, and top piece 106 interconnects end portions 112 and 118.

Blade members 42 and 142 and clips 44 and 144 are preferably constructed of a metal such as steel. Blocks 40 and 140 and straps 34 and 36 are preferably constructed from a low friction material such as ultra high molecular weight polyethylene (UHMW). A low-friction material available from duPont under the trademark NYLONTRON is also suitable. Upper assembly 30 is formed by placing blade member 42 on mounting surface 66, and then forcing clip 44 over the top and sides of block 40 such that the longitudinal edges of top pieces 104 and 106 are retained under lips 72 and 74 respectively. The longitudinal extent of blade member 42 is slightly less than the distance between lips 72 and 74. Similarly, the lateral extent of end sections 80 and 82 are slightly less than the lateral extent of the block. However, tips 90 and 92 extend slightly over respective edges 68 and 70, as best illustrated in FIG. 3. The formation of lower assembly 32 is identical to that of the upper assembly. Clips 44 and 144 are formed such that straps 34 and 36 can be inserted in the slots formed by the center portions of the clips and the adjacent sidewalls of the corresponding blocks. For example, the upper end of strap 34 may be inserted through the slot formed by center portion 108 of clip 44 and the adjacent lateral surface of block 40, as shown in FIGS. 2 and 3. When strap 34 is so inserted, the strap makes contact with blade 90, as illustrated in FIG. 3. Because blade 90 is angled slightly upward and away from block 40, the result is a ratchet-like arrangement in which strap 34 can be moved upward in the slot upon application of a comparatively small force, but can be moved downward in the slot only upon application of a large force, or by manipulation of blade 86 by a separate tool. The U-shaped openings between center section 84 and end sections 80 and 82 of blade member 42 permit insertion of a screwdriver or other tool under the blades, such that the blades can be raised above mounting surface 66 to move tip 90 or 92 upward and away from the block. Such upward movement of the blade tip disengages the tips from the straps, to thereby permit the straps to be moved downwardly with respect to the upper assembly. The connections between lower assembly 32 and straps 34 and 36 is identical to that described for the upper assembly.

When the tensioning device of the present invention is initially applied to a drive chain, drive belt or other flexible drive member, straps 34 and 36 are first inserted a short distance into one of the assemblies, such as the upper assembly, and the partially-formed tensioning device comprising the upper assembly and straps is then placed over one of the runs of the drive chain. The other assembly is then placed on the opposite side of the other drive chain runn, and the straps are inserted into that assembly. The upper and lower assemblies are then manually moved closer together until the tensioning device exerts an appropriate force on the drive chain runs. When the drive system is in operation, the drive chain runs pass through grooves 60 and 160 of blocks 40 and 140, respectively. When the blocks are spaced an appropriate distance from one another, the tensioning device maintains a fixed average position between the sprockets during operation of the drive system, without the use of any auxiliary means to position the tensioning device with respect to the sprockets. The best separation of the blocks may readily be determined by initially setting the blocks a comparatively large distance apart, and then operating the drive system and gradually decreasing the block separation until the optimum position is found. As the drive system experiences wear over a comparatively long time period, drive chain 16 will exhibit increased amount of slack. Adjustment for such slack can again be readily made by manually forcing the blocks together, again until the optimum position is found. Removal of the tensioning device from the drive chain can best be accomplished by means of a screwdriver or the like, to force blade tips away from the straps, as described above.

While the preferred embodiment of the invention has been illustrated and described, it should be understood that variations will be apparent to those skilled in the art. For example, in certain applications, it may be found desirable to connect blocks 40 and 140 such that the blocks are secured a selected distance from one another but are free to rotate about an axis extending between the blocks. Accordingly, the invention is not to be limited to the specific embodiments illustrated and described, and that the true scope and spirit of the invention are to be determined by reference to the following claims.

The embodiments of the invention in which an exclusive property or privilege is claimed are defined as follows:

1. A tensioning device for a drive system having a flexible drive element, the tensioning device comprising:
   a first tensioning member having a first concave surface;
   a second tensioning member having a second contact surface;
   positioning means for securing the first and second tensioning members a selected distance away from one another such that the first and second contact surfaces are spaced apart from and facing one another, the positioning means including means for adjusting the spacing between the contact surfaces to thereby adjust the tensioning device so as to cause the tensioning device to apply a suitable tensioning force to the drive element, the positioning means incuding a ratchet-like mechanism arranged such that the force required to move the tensioning members toward one another is smaller than the force required to move the tensioning members away from one another.

2. The tensioning device of claim 1, wherein each tensioning member is shaped so as to form a channel in one surface thereof, and wherein each channel includes an elongated central portion comprising the respective contact surface flanked by a pair of rails that extend outward from the contact surface on either side thereof, the contact surface and rails defining a groove through which the flexible drive element rides, the height of the rails above the contact surface being less than the thickness of the flexible drive element.

3. The tensioning device of claim 1, wherein the positioning means includes a pair of straps extending between the first and second tensioning members and engagement means for connecting the straps to the tensioning members.

4. The tensioning device of claim 3, wherein each tensioning member comprises a block that includes the respective contact surface, and wherein the engagement means comprises a pair of engagement members and fastening means for securing the engagement members to the block, the engagement members being adapted to engage the respective straps to provide the ratchet-like mechanism.

5. The tensioning device of claim 4, wherein each fastening means comprises a clip shaped so as to form a pair of slots through which the respective straps extend.

6. The tensioning device of claim 5, wherein each engagement member comprises a blade, the blades extending into the respective slots so as to engage the straps when the straps are inserted into the slots.

7. The tensioning device of claim 6, wherein each blade includes a tip that is angled away from the block to which the blade member is mounted, thereby providing the ratchet-like mechanism.

8. The tensioning device of claim 7, wherein each engagement means comprises a blade member shaped to form the blades, each blade member being shaped so as to form openings adjacent the blades, whereby a tool may be inserted between the blade and the block to move the blade out of contact with the respective strap.

* * * * *

UNITED STATES PATENT AND TRADEMARK OFFICE
CERTIFICATE OF CORRECTION

PATENT NO. : 4,662,862
DATED : May 5, 1987
INVENTOR(S) : Les Matson

It is certified that error appears in the above-identified patent and that said Letters Patent is hereby corrected as shown below:

Column 1, Line 31, "tensoning" should be --tensioning--
Column 2, Line 16, "inlcudes" should be --includes--
Column 5, Line 27, "runn" should be --run--
Column 6, Line 7, "concave" should be --contact--
Column 6, Line 20, "incuding" should be --including--

Signed and Sealed this

Twenty-fifth Day of August, 1987

*Attest:*

DONALD J. QUIGG

*Attesting Officer*     *Commissioner of Patents and Trademarks*